Nov. 12, 1940.  C. C. PECK  2,221,432
PULLEY
Filed May 17, 1939
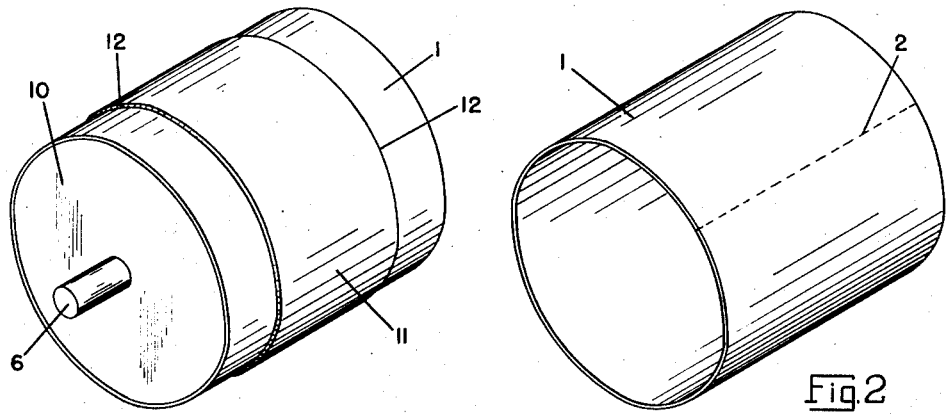
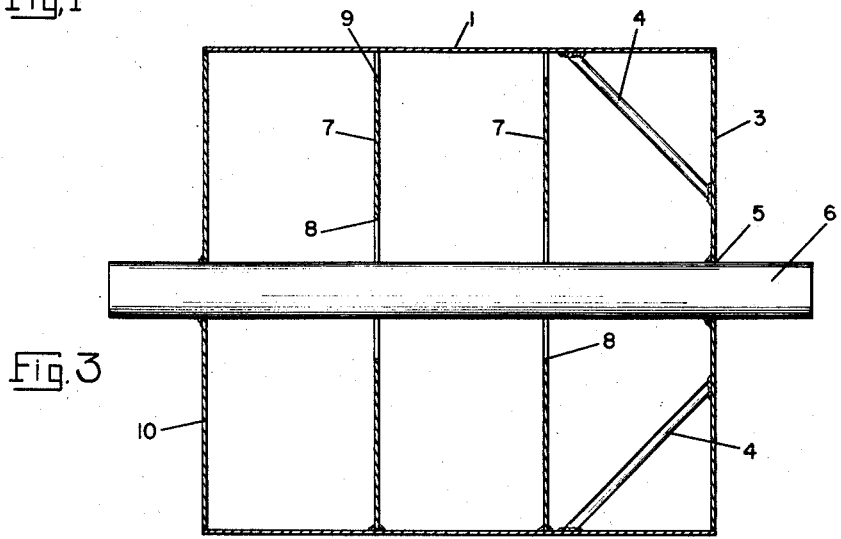
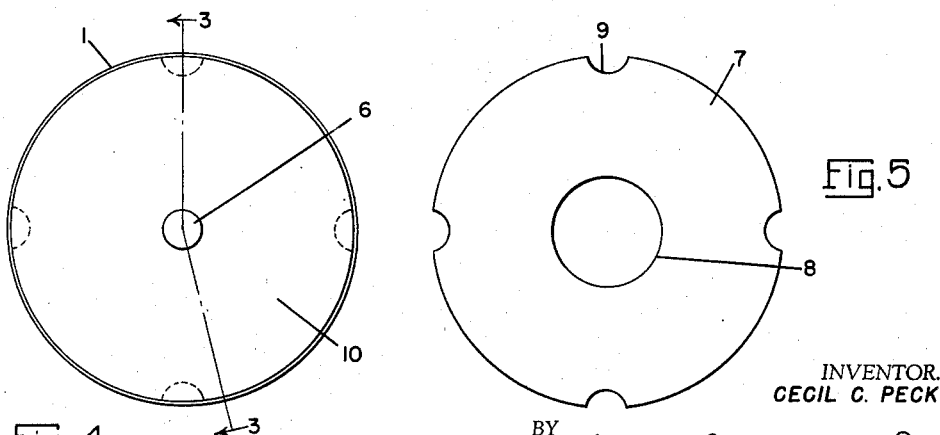
INVENTOR.
CECIL C. PECK
BY *Oberlin, Limbach & Day*
ATTORNEYS.

Patented Nov. 12, 1940

2,221,432

UNITED STATES PATENT OFFICE 2,221,432

PULLEY

Cecil C. Peck, Cleveland, Ohio

Application May 17, 1939, Serial No. 274,181

3 Claims. (Cl. 74—230.8)

This invention relates, as indicated, to pulleys and the like and more particularly to large size pulleys of sheet metal construction.

Certain industries such as bakeries require large size pulleys for conveyor belts, drive belts, etc., but the conditions of use require that there be no exterior recesses which might harbour dirt and could not be easily cleaned. It is, therefore, an object of this invention to provide a pulley of large dimensions constructed of sheet metal stock so as to have a smooth exterior and which will be of strong although very light construction.

Other objects will appear as the description proceeds.

To the accomplishment of the foregoing and related ends, said invention, then, consists of the means hereinafter fully described and particularly pointed out in the claims.

The annexed drawing and the following description set forth in detail certain structure embodying the invention, such disclosed means constituting, however, but one of various structural forms in which the principle of the invention may be used.

In said annexed drawing:

Fig. 1 is a perspective view of one approved form of my new pulley showing an increased periphery in its central portion.

Fig. 2 is a perspective view of the cylinder forming the outer periphery of the pulley.

Fig. 3 is a transverse cross-sectional view along the line 3—3 on Fig. 4.

Fig. 4 is an end elevational view of my new pulley.

Fig. 5 is an elevational view of one of the interior brace plates employed to obtain the necessary rigidity in the finished structure.

Referring now more specifically to the drawing and particularly Figs. 2 and 3, the outer periphery of the pulley of this invention comprises a sheet of metal having two opposite edges welded together to form a cylinder 1. Excess weld metal is then removed from the seam 2.

An end-plate 3 is then welded in one end of the cylinder, the outer edge of said plate being beveled to form a V-shaped cavity for the weld metal. Struts 4 in the form of short bars or rods cut off at proper angles are fixed in place between said end-plate and the inner wall of the cylinder, as by spot-welding, to provide rigidity against sidewise buckling. Such braces may be as numerous as desired but three or four will generally suffice. The end-plate 3 has a hole 5 in its center through which a shaft 6 is inserted which is then welded to the inner surface of said plate.

Brace plates 7 may then be snugly fitted within the cylinder and either "tacked" or spot-welded in place. These plates, as best seen in Fig. 5, may have relatively large holes 8 in their centers as it is not necessary that they fit tightly about the shaft 6. Moreover, scallops 9 may be cut in their edges to facilitate the introduction of paint or other rust inhibitor, a small hole being drilled in one of the end-plates to permit its injection.

End-plate 10 is then fitted over the shaft and welded thereto and also welded in the cylinder 1, the edge of the plate being beveled as in plate 3 to provide a trough for the weld metal.

If desired that the pulley have a crowned effect as in pulleys for certain conveyor belts, a second cylinder 11 of less width than cylinder 1 and of a diameter to fit snugly thereover may be secured about the central portion of the pulley's periphery as shown in Fig. 1. Such supplemental shell is preferably secured in place by having its edges 12 welded to the main cylinder or shell 1. Such welded edges will furthermore be formed or beveled to provide a relatively smooth surface.

As indicated, a pulley constructed in accordance with this invention may be of a very large size, yet be formed of very light material. In a pulley 28 to 32 inches wide with a diameter of 30 inches, for example, the cylinder 1 may have a gauge of $\frac{3}{16}$ in. or $\frac{1}{4}$ in. while the end-plates and brace plates are from $\frac{1}{4}$ in. stock.

I have found that a pulley constructed as above described will withstand all strains to which it is normally subjected despite the fact that it is of exceedingly light construction for a pulley of such large dimensions. The exterior surfaces are smooth and without crevices or crannies in which dirt might lodge, making the pulley of this invention particularly suitable for use in bakeries and the like where a high standard of cleanliness must be maintained. Many other uses for this new pulley are obvious, the ends of the shaft 6 being journalled as desired depending on the conditions of use.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A pulley for conveyor belts and the like comprising a sheet metal cylinder, sheet metal end-plates welded therein, sheet metal brace plates welded to the interior of said cylinder between said end-plates, a shaft passing centrally through said plates and welded to said end-plates, and struts angularly disposed between the inner wall of said cylinder and one of said end-plates.

2. A pulley for conveyor belts and the like comprising a sheet metal cylinder, sheet metal end-plates welded therein, sheet metal brace plates welded to the interior of said cylinder between said end-plates, and a shaft passing centrally through said plates and welded to said end-plates, said brace plates having holes in their central portions of greater diameter than the diameter of said shaft.

3. A pulley for conveyor belts and the like comprising a sheet metal cylinder, sheet metal end-plates welded therein, sheet metal brace plates welded to the interior of said cylinder between said end-plates, and a shaft passing centrally through said plates and welded to said end-plates, said brace plates having holes in their central portions of greater diameter than the diameter of said shaft, and scallops cut from their outer circumference.

CECIL C. PECK.